United States Patent [19]
Crossfield et al.

[11] Patent Number: 5,965,214
[45] Date of Patent: Oct. 12, 1999

[54] METHODS FOR CODING MAGNETIC TAGS

[75] Inventors: Michael David Crossfield, West Wickham; Christopher John Coggill, West Wratting, both of United Kingdom

[73] Assignee: Flying Null Limited, Cambridge, United Kingdom

[21] Appl. No.: 08/844,885

[22] Filed: Apr. 22, 1997

[30] Foreign Application Priority Data

Apr. 23, 1996 [GB] United Kingdom .................... 9608329

[51] Int. Cl.⁶ ...................................................... H01F 1/00
[52] U.S. Cl. ........................ 427/547; 427/130; 427/131; 427/132; 427/261; 427/287; 427/331; 427/404; 427/409; 427/599
[58] Field of Search ...................... 427/128–132, 427/599, 547, 261, 287, 331, 404, 409

[56] References Cited

U.S. PATENT DOCUMENTS

| | | | |
|---|---|---|---|
| 3,848,112 | 11/1974 | Weichselbaum et al. | 235/61.7 R |
| 3,864,691 | 2/1975 | Schroeder | 346/74.1 |
| 4,098,935 | 7/1978 | Knudsen | 428/40 |
| 5,458,062 | 10/1995 | Goldberg et al. | 101/485 |
| 5,665,429 | 9/1997 | Elwakil | 427/218 |

Primary Examiner—Bernard Pianalto
Attorney, Agent, or Firm—Kubovcik & Kubovcik

[57] ABSTRACT

A method of fabricating a tag or marker carrying or intended to carry a magnetic code is described. The method comprises applying a particulate magnetic material to a surface region of the tag by a printing or transfer process. The particulate magnetic material is generally deposited in the form of discrete elements or indicia. A tag thus produced can be coded magnetically by magnetising the elements or indicia, e.g. with a permanent magnet. This provides a very versatile and relatively rapid means of generating coded tags or labels virtually without limit on the variety of codes which may be adopted.

18 Claims, 2 Drawing Sheets

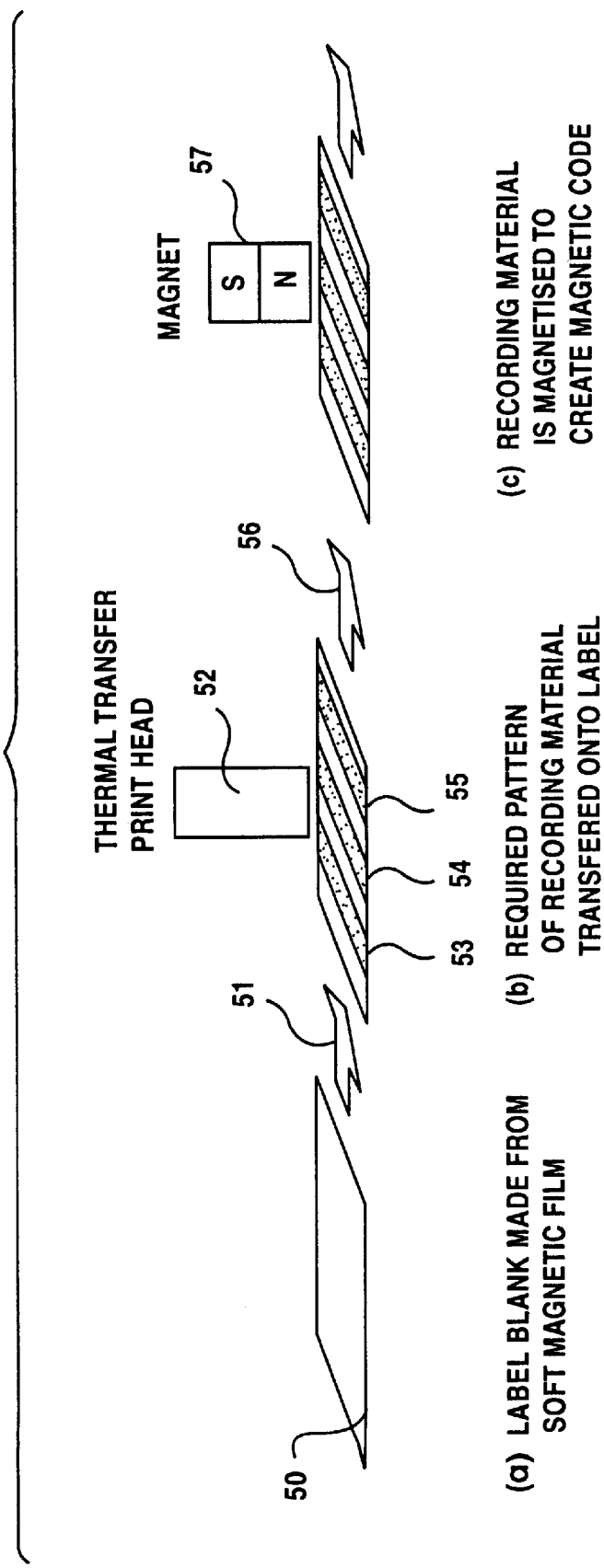

METHODS FOR CODING MAGNETIC TAGS

BACKGROUND TO THE INVENTION

This invention relates to the production of magnetic labels or tags which can be used, for example, in identifying articles to which they are attached.

In previous patent applications (PCT/GB96/00367, now published as WO97/04338; and PCT/GB96/00823, now published as WO96/31790) we have described remote identification tags which may be interrogated using alternating magnetic fields. In response to interrogation, the tags emit magnetic signals which may be detected in suitable receiving equipment. Such tags have many applications in diverse areas including article identification, security and access control.

Certain of the tags described in International Patent Application PCT/GB96/00367 (claiming priority from GB 9506909.2 and GB 9514581.9) contain elements of high permeability, low coercivity, magnetic alloy in the form of a strip, wire or thin film, overlaid with a medium coercivity magnetic layer. The magnetic signal or "signature" generated by the high permeability element in response to interrogation by an applied magnetic field is determined by the magnetisation pattern stored in the medium coercivity layer, which acts as a "coding" layer, and by the characteristics of the high permeability element.

In practical implementations, tag coding can be carried out during tag manufacture by contact-recording the appropriate magnetic pattern onto a continuous coding layer using an array of permanent magnets. This method is particularly suitable for producing many tags with the same code.

Another method, which is suitable for manufacturing tags whose code will never require to be changed, is to place magnetised pieces of coding material at appropriate positions on the high permeability material.

A more flexible arrangement uses a magnetic recording head of the type well-known for recording information onto magnetic tape. With this arrangement, tags manufactured with an un-magnetised coding layer can have patterns individually coded at the point-of-issue. This is extremely useful for applications such as airline baggage tagging, where individual tag details (passenger name etc.) are not known in advance of issue. The drawbacks to this method are the need for precise alignment of the head with the tag, and the cost and complexity of the equipment. It is also difficult to achieve very high recording field strengths, so tags with high resistance to corruption by extraneous magnetic fields are hard to produce.

THE INVENTION

The present invention provides a new way of coding data into tags which allows individual tag coding, does not require a contact magnetic recording head, and allows very high recorded field strengths.

The invention utilises a coding layer which is formed from discrete zones or elements of medium or high coercivity magnetic material. The elements are uniformly magnetised in the final stage of the coding process.

SUMMARY OF THE INVENTION

According to one aspect of the present invention, there is provided a method of fabricating a tag or marker carrying or intended to carry a magnetic code, which method comprises applying a particulate magnetic material to a surface region of the tag by a printing or transfer process. The particulate magnetic material may be deposited in the form of a magnetic bar code; it will generally comprise an array of elements or indicia and may, for example, comprise a regular array of geometric shapes.

According to another aspect of the invention, there is provided a method of generating a magnetic code in or on a magnetic tag or label, which method comprises depositing a particulate magnetic material onto the label in the form of discrete elements or indicia, and then magnetising the elements or indicia. The magnetic code of a given tag can be readily selected, generally being determined by at least one of (a) the shape, (b) the number and (c) the relative disposition of deposited elements or indicia. This provides a very versatile and relatively rapid means of generating coded tags or labels virtually without limit on the variety of codes which may be adopted.

DESCRIPTION OF THE PREFERRED EMBODIMENTS

One suitable coding material for use in this invention is a finely-divided ferrite. Suitable materials are readily available commercially from several suppliers (e.g. BASF), and are used for the manufacture of recording tape.

In one embodiment of this invention, the ferrite material is suspended in a liquid medium, and is deposited onto the high-permeability tag material in a pattern determined by a standard printing process. There are various possibilities here, including ink-jet as well as more traditional processes.

In a variant of this arrangement the ferrite material is supported on a backing ribbon of plastic material, being transferred in the required pattern to the high-permeability layer of the tag by a thermal transfer process using a heated print-head- Such thermal-transfer processes are routinely employed in conventional thermal printing machines, and also in the manufacture of magnetic stripe cards. Thermal transfer magnetic recording tape is available commercially from suppliers such as BASF and Kurtz Stamping Foils Ltd.

Another arrangement in accordance with this invention is to use pieces of coding material (for example, thin nickel or magnetic steel foil) which are bonded to the high permeability layer using adhesive. In this case the coding material could be in the form of basic pre-cut shapes, or could be punched or otherwise formed (e.g. cut) to shape on demand.

In all cases the final magnetic pattern imposed on the high-permeability label element may be defined by uniformly magnetising the entire pattern of coding material. This can be accomplished by passing the complete tag over a permanent magnet, the requirement being that the field level at the tag is sufficient to magnetically saturate the coding material. Since rare-earth magnets which can produce local field levels of many kAmps/metre are readily available, physical contact with the magnet is not essential. Moreover, relatively-high coercivity coding materials can, if required, be used. This makes it possible to produce tags which possess high resistance to corruption by extraneous magnetic fields.

Permanent magnets are convenient for this application because they require no power source. However, in some cases it may be advantageous to energise the magnetisation only when it is required, and in these cases an electromagnet may be used.

Thus it will be appreciated that one embodiment of this invention provides a method of fabricating a tag or marker carrying or intended to carry a magnetic code, which method comprises applying a particulate magnetic material (e.g. ferrite) to a surface of the tag by a printing or transfer process.

BRIEF DESCRIPTION OF THE DRAWINGS

For a better understanding of the invention, and to show how the same may be carried into effect, reference will now be made, by way of example, to the accompanying drawings, in which;

FIG. 3 illustrates schematically a process for the manufacture of a magnetically coded label.

Figure 1:
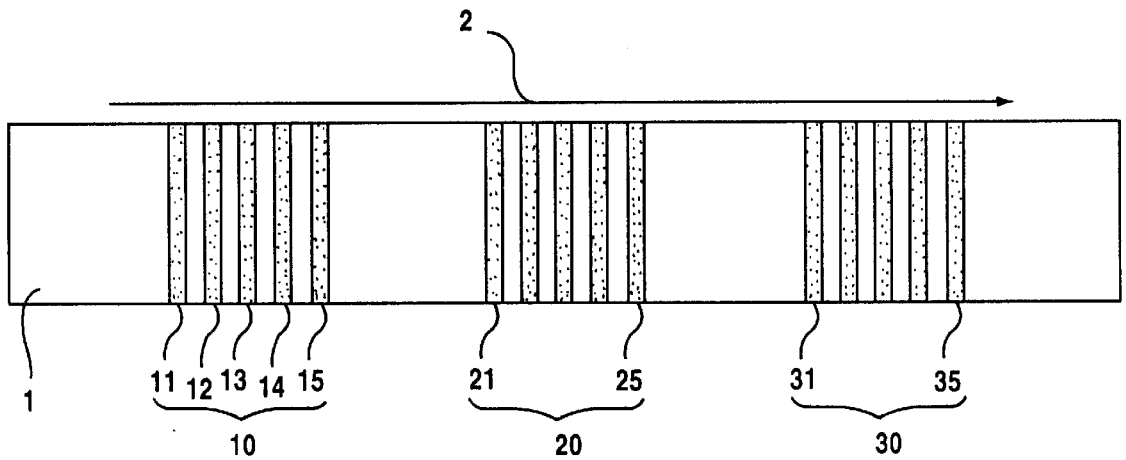
FIG. 1 illustrates a label in accordance with this invention coded with a one-dimensional magnetic code.
Figure 2:
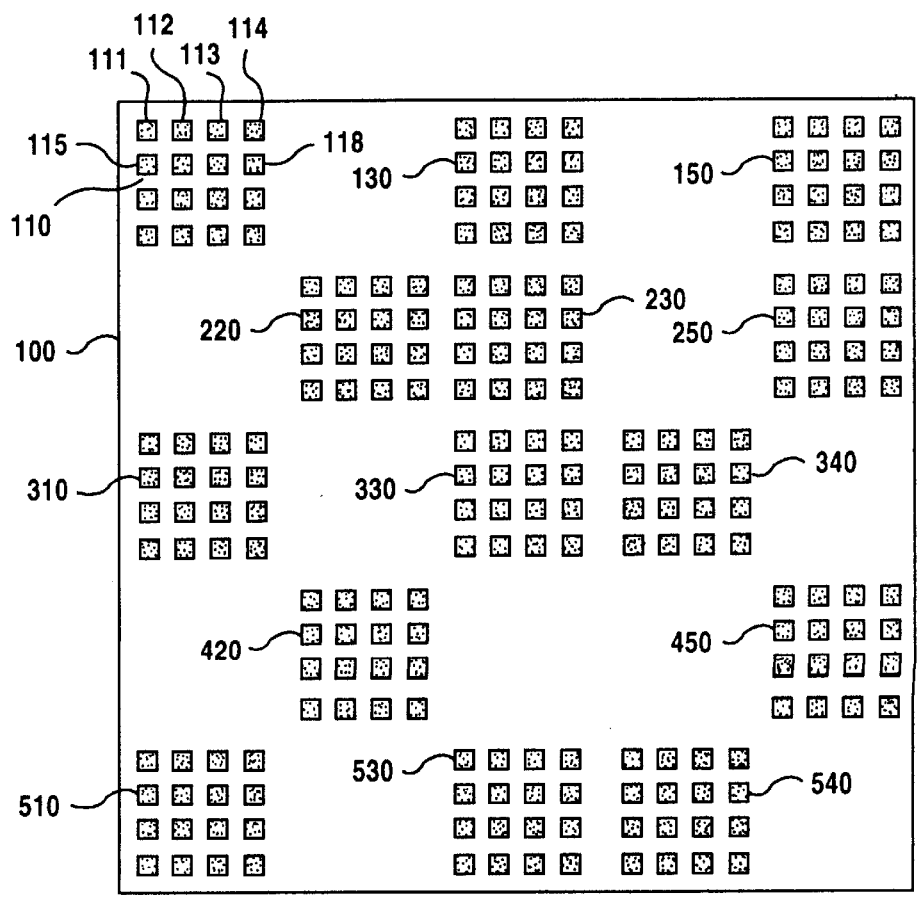
FIG. 2 illustrates a label in accordance with this invention coded with a two-dimensional magnetic code.

The coding convention adopted in implementing the present invention can be of any sort, for example width and spacing modulation of a bar code; the arrangements shown in FIGS. 1 and 2 are for the purposes of illustration only, and the invention is not limited to these or indeed to any particular type of coding. In addition, the elements or indicia which make up the code may be visible in the finished product, or they may be rendered invisible by overcoating all or parts of the label with an optically opaque layer.

Referring to FIG. 1, a rectangular label 1 is produced as will now be described. The starting material is a strip of thin plastics material, for example PET (polyethylene terephthalate), which forms the substrate of the label. The substrate is 25 microns in thickness, and 3 mm wide; its length depends on the number of bits to be carried in the magnetic code of the final label, the illustrated embodiment having three bits and a length of 24 mm.

The plastics substrate is coated uniformly with a one micron layer of a low coercivity, high permeability amorphous magnetic alloy. Many such alloys are known and are suitable for use in the invention. In the illustrated embodiment, a commercially available material is used, namely ATALANTE, manufactured and sold by IST BV of Belgium. This is a magnetically active foil comprising a PET substrate coated with an amorphous magnetic alloy, and has an intrinsic relative permeability, $\mu_R$, of the order of $10^5$ and a coercivity, $H_c$, of less than 10 A/m. Instead of using a precoated substrate such as ATALANTE, a thin film of a suitable amorphous magnetic alloy may be applied to a chosen substrate by conventional techniques which are well known in the art and do not need to be described here.

Selected regions of the label are then overcoated with a high coercivity magnetic recording material, many suitable types being readily available from suppliers of recording media. These typically have high remanence and a coercivity in the range 40–10,000 oersted (1 A/m=4 $\pi.10^{-3}$ Oe). In this instance, the recording material used was a thermal laminating foil manufactured and sold by Kurz Stamping Foils as a 650 Oe thermal transfer laminating foil. The foil, which is 16 microns thick, consists of ferrite particles held together in a matrix of binder and adhesive. The ferrite foil was deposited onto the amorphous magnetic alloy in the form of preselected, intermittent code patterns or indicia by means of a thermal transfer printing process using a pressure element heated to 150°C. To be effective, the deposited material should be of sufficient thickness for it to provide adequate magnetization to maintain the underlying thin film layer in magnetic saturation when the label is used and is thus in the presence of label interrogating fields. Typically, with commercially available ferrite tapes such as the Kurz product used in this instance, the coating thickness will be in the range 5 to 20 microns.

When the recording material is deposited, it is unmagnetised. In the illustration, the recording material is in the form of strips 11, 12, 13, 14, 15; 21 . . . 25; and 31 . . . 35. These constitute bands 10, 20 and 30, respectively. The strips are deposited perpendicular to the axis of magnetisation of the soft magnetic film, this axis being indicated at 2; this arrangement makes use of the fact that magnetic permeability is strongly shape-dependent as will be explained further below.

The label is then activated by subjecting it to a magnetic field of sufficient strength to permanently magnetise the strips 11–35. Because of the low remanence of the amorphous magnetic alloy material, the areas between the bands 10, 20 and 30 are not magnetized by this process. However, the areas of amorphous magnetic alloy material directly beneath the bands 10, 20 and 30 are magnetically clamped as a result of the fields from the magnetised strips coupling into the underlying soft material, thereby rendering them magnetically inactive. The use of a series of uniformly spaced strips 11 . . . 15 is advantageous (rather than applying the recording material over the whole of band 10) because, after the magnetisation step just described, this arrangement serves to magnetically cut the underlying region into regions sufficiently short as to have a permeability so low that the underlying region produces a negligible response to interrogation compared with that of the uncoated regions of the label. As mentioned earlier, this makes use of shape dependent permeability effects.

Instead of using a coating of an amorphous magnetic alloy material as described above, the substrate may first be coated with the recording material in the desired configuration, and thereafter a soft magnetic material in the form of a strip or a wire is applied to the label.

Referring now to FIG. 2, a generally square label 100 is produced in a manner analogous to that described above for the rectangular (one dimensional) label 1. Instead of depositing the recording material onto the amorphous magnetic alloy coating in strip form, it is deposited as a series of square zones 110, 130, 150; 220, 230, 250; 310, 330, 340; 420, 450; 510, 530 and 540 each of which is made up of a 4×4 array of smaller squares such of as 111, 112, 113, 114, 115 . . . 118 . . . et cetera which constitute the deposited material. Again, the use of this type of array ensures that the underlying regions of soft magnetic material are magnetically cut into elements too small to have significant permeability. It should be understood that the simple arrays and shapes illustrated in FIGS. 1 and 2 are merely examples of what may be used in a label in accordance with this invention; more intricate arrays, and less regular shapes may equally be employed.

The manufacture of a label in accordance with this invention is schematically illustrated in FIG. 3. Here, a precursor label 50 cut from an ATALANTE film (PET plastics substrate coated with a one micron thick coating of amorphous magnetic alloy) is conveyed as at 51 to a thermal print head 52. A commercially available thermal print head may be used for this purpose, or a dedicated print head may be made using, for example, surface mounted thick film resistors. Commercially available print heads usually consist of a linear array of individually heatable elements (or "dots"), there typically being 8 or 10 dots per millimetre. Somewhat coarser print heads are preferred in the practice of this invention. Here, bands of recording material such as 53, 54 and 55 are deposited over the soft magnetic layer. The label is then conveyed as at 56 to a magnet 57, which permanently magnetises the zones 53, 54 and 55 as already described.

We claim:

1. A method of generating a magnetically coded label, which comprises: (a) depositing on the surface of a substrate (1) a first magnetic material which is a low coercivity, high permeability material; and (2) a second magnetic material which is a relatively high coercivity material; and (b) magnetizing the relatively high coercivity magnetic material, or parts thereof, to generate an array of magnetized, spaced apart elements or indicia such that those parts of the first magnetic material adjacent to respective magnetized elements or indicia of said array are cut magnetically into regions sufficiently small as to have a permeability so low that the said parts produce a negligible response when the label is subjected to magnetic interrogation.

2. A method according to claim 1, wherein said high coercivity magnetic material is deposited as an array of spaced apart elements or indicia.

3. A method according to claim 1, wherein said high coercivity magnetic material is deposited as a thin layer or foil.

4. A method according to claim 3, wherein said high coercivity magnetic material is thermal transfer magnetic recording tape.

5. A method according to claim 1, wherein said second magnetic material is applied in unmagnetized form, and is subsequently magnetized by subjecting the label to a magnetic field.

6. A method according to claim 5, wherein the second magnetic material is magnetized by passing the label over a permanent magnet.

7. A method according to claim 1, wherein the second magnetic material is applied in pre-magnetized form.

8. A method according to claim 7, wherein the second magnetic material is affixed adhesively.

9. A method according to claim 1, wherein the first magnetic material is deposited directly onto the substrate, and then selected regions thereof are overcoated with said second magnetic material.

10. A method according to claim 1, wherein said second magnetic material is deposited directly onto selected regions of said substrate, after which said first magnetic material is applied in the form of a strip or a wire.

11. A method according to claim 1, wherein said second magnetic material is applied to the surface of the substrate by a printing or transfer process.

12. A method according to any preceding claim, wherein said second magnetic material comprises a particulate magnetic material.

13. A method according to claim 12, wherein said particulate magnetic material is ferrite.

14. A method according to claim 1, wherein the particulate magnetic material is applied to a surface region of the label by a thermal printing or stamping process using a foil in which the particulate magnetic material is embedded.

15. A method according to claim 1, wherein the particulate magnetic material is applied to a surface region of the label by a printing process using a liquid suspension of the particulate magnetic material.

16. A method according to claim 11, wherein the low coercivity high permeability magnetic material is an amorphous magnetic alloy having a coercivity of less than 100 A/m and an intrinsic relative permeability, $\mu_R$, greater than $10^3$.

17. A method according to claim 1, wherein said second magnetic material is deposited in the form of a magnetic bar code.

18. A method according to claim 1, wherein the particulate magnetic material is deposited in the form of a regular array of geometric shapes.

* * * * *